Aug. 18, 1931.    J. W. BAEHR    1,819,317
ARTIFICIAL HAND
Filed March 22, 1929    2 Sheets-Sheet 1

Inventor
Justus Wilhelm Baehr
By Caswell & Lagaard
Attorneys

Inventor
Justus Wilhelm Baehr

Patented Aug. 18, 1931

1,819,317

UNITED STATES PATENT OFFICE

JUSTUS WILHELM BAEHR, OF MINNEAPOLIS, MINNESOTA

ARTIFICIAL HAND

Application filed March 22, 1929. Serial No. 349,027.

My invention relates to artificial hands and has for its object to provide a device with means for picking up small objects, and with separate means operated in conjunction therewith for holding larger objects.

Another object of the invention resides in providing a support, and mounting thereon two fingers adapted to move relative to one another to grasp smaller objects and to mount a third finger thereon to engage with the first two fingers for holding larger objects.

A still further object of the invention resides in providing a pivot mounted in said support and passing jointly through all of said fingers, said third finger being journalled for oscillatory movement upon said pintle to move toward and from said first and second fingers, and said first and second fingers being mounted for rocking movement upon said pintle to move toward and from one another.

Another object of the invention resides in positioning the extreme end of said third finger between the first and second fingers when in closed position, and in employing locking means on said third finger adapted to be engaged by said first and second fingers for holding the third finger in locked position with respect thereto.

A still further object of the invention resides in providing means for restraining the third finger from moving longitudinally on said pintle and in providing means for depriving the first and second fingers from rotational movement thereon.

An object of the invention resides in providing means for operating said fingers whereby said first and second fingers are spread apart to unlock the third finger, and said third finger is subsequently moved away from the first and second fingers.

A still further object of the invention resides in providing a lever for operating said fingers, said lever being pivoted to said third finger and being adapted to swing either about its pivot or about said pintle to move through two different arcs, said lever serving in one of its movements to spread said first and second fingers apart and in its other movement to swing said third finger.

Another object resides in forming said lever with a cam and said first and second fingers with cam surfaces adapted to be engaged thereby for spreading said first and second fingers upon swinging of said lever about its pivot, and in further providing said lever with a stop adapted to engage said third finger for moving said third finger away from said first named fingers.

A feature of the invention resides in constructing said cam in the form of an arc with the center thereof, when said lever is moved to cause the stop thereof to engage said third finger, coinciding with the axis of said pintle to cause said cam to ride along said cam surfaces without moving said first and second fingers upon oscillation of said third finger.

Another object of the invention resides in providing an elastic band encircling all of said fingers for holding said fingers in closed position.

Other objects of the invention reside in the details of construction thereof and in the novel combination and arrangement of parts hereinafter illustrated or described.

Figure 1:
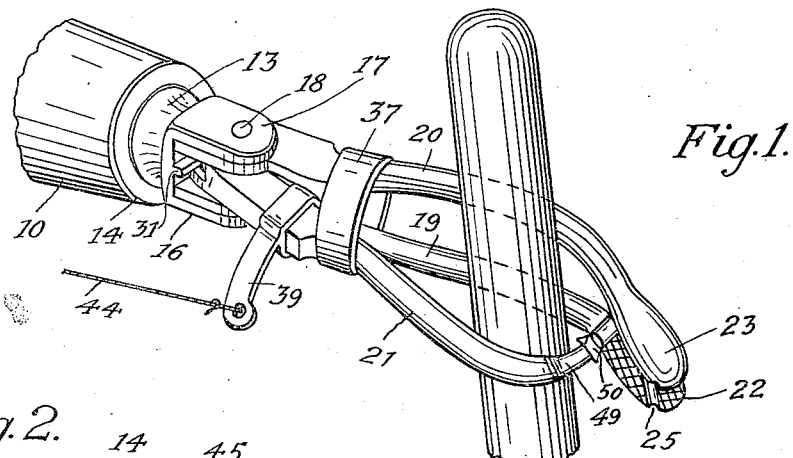
Fig. 1 is a perspective view of an artificial hand illustrating an embodiment of my invention and showing the method of holding an object therein.

In the use of an artificial hand, it frequently becomes desirable to provide grasping means for picking up small articles, such as pencils, paper, knives, forks, spoons, and other objects where but small movement of the grasping fingers is necessary. At other times, it becomes highly desirable to use the fingers for holding larger objects, such as tools, suitcases or similar devices in which appreciable movement of the fingers is required. In many cases, it is preferred to lock the fingers in place when in closed position to prevent the opening of the same during the use of the artificial hand. Heretofore, it has been impossible to procure a single artificial hand having all of these functions. The instant invention provides a single device whereby all of the advantages and functions essential with artificial hands may be procured.

The invention is designed for attachment to an ordinary arm stump socket, such as indicated at 10 in the drawings, which is internal threaded at 11 to receive the threaded end 12 of the shank 13 to which the artificial hand proper is attached. This shank is constructed with a flange 14 adapted to butt against the arm stump socket 10 to hold the hand properly attached thereto. If desired, any other type of attachment may be used for attaching the supporting shank to the arm stump socket, the type shown being merely selected for the purpose of illustration.

The shank 13 of the hand proper is formed with a base portion 15 from which issue two outwardly extending parallel ears 16 and 17. A pintle 18 passes through these two ears and is riveted in place thereon and forms a bearing for supporting three fingers 19, 20 and 21 which will now be described in detail.

Figure 2:
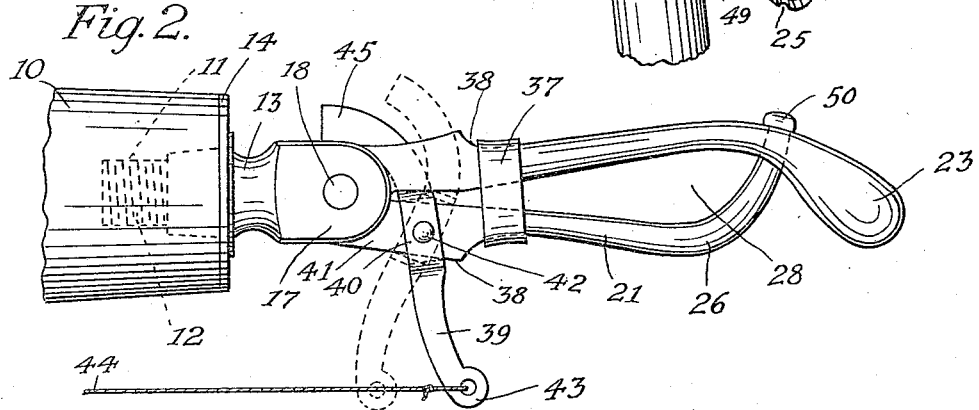
Fig. 2 is a side elevational view of the hand illustrated in Fig. 1, showing the same in closed position.
Figure 3:
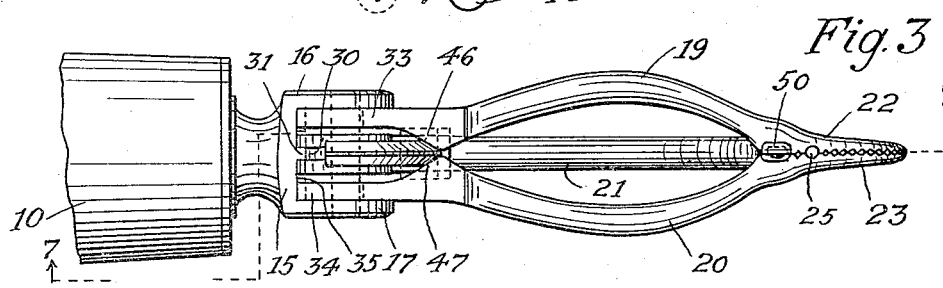
Fig. 3 is a plan view of the structure shown in Fig. 2 with the elastic band removed.
Figure 5:
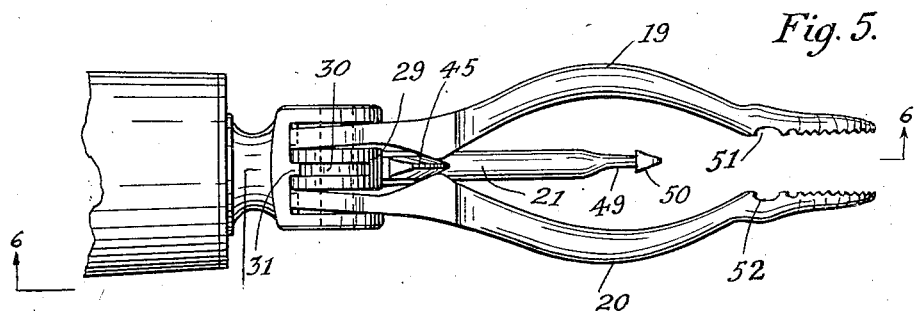
Fig. 5 is a view similar to Fig. 4 illustrating the fingers in fully open position.
Figure 6:
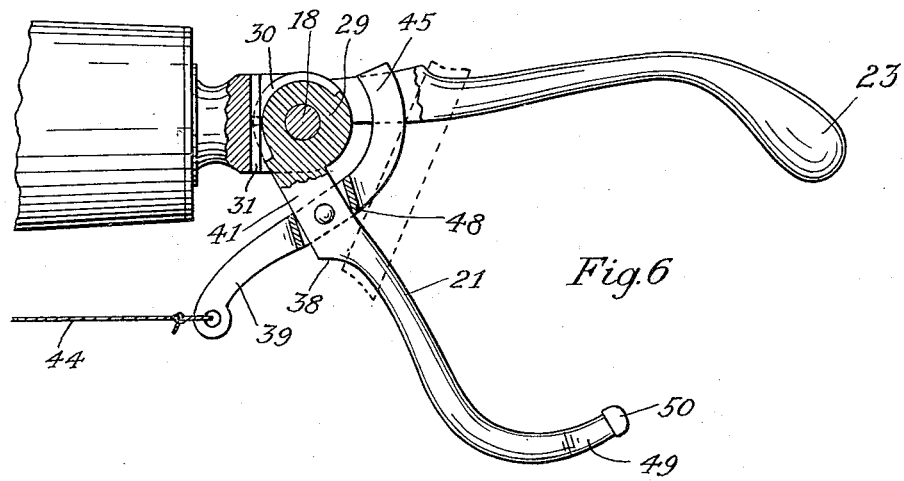
Fig. 6 is an elevational sectional view taken on line 6—6 of Fig. 5.
Figure 7:
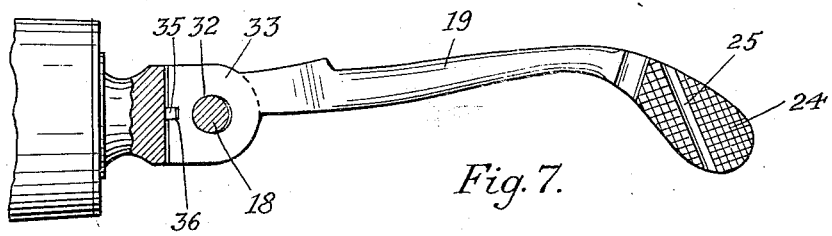
Fig. 7 is a sectional view taken on line 7—7 of Fig. 3.

All of the three fingers 19, 20 and 21 are mounted upon the pintle 18, the fingers 19 and 20 being adapted to move toward and from each other, as shown in Figs. 5 and 3, and the finger 21 being adapted to be moved from the fingers 19 and 20, as shown in Figs. 2 and 6. The fingers 19 and 20 are preferably bowed along the intermediate portions thereof, as best shown in Fig. 3, and approach one another at the extreme ends thereof forming grasping tips 22 and 23, preferably roughened, as indicated at 24, to readily grasp the objects to be handled by the hand. These grasping tips are formed with registering grooves 25 which serve to hold slender articles, such as pencils or silver ware, and which permit of using the same in the ordinary manner for which said articles are intended. The finger 21 is also preferably bowed, as designated at 26, so that when the fingers are closed, as shown in Fig. 2, the extreme portion 27 of the said finger is adapted to lie between the two fingers 19 and 20. When the fingers are so disposed, a space 28 is formed between the two fingers 19 and 20 and the finger 21 in which the handle of a suitcase, or any other suitable device, may be placed, for the purpose of holding the same in proper position for use.

The extreme end of the finger 21 is formed with a boss 29 which is rotatably mounted upon the pintle 18 at the center thereof. This boss is of a length considerably less than the distance between the two ears 16 and 17 of shank 13 and is held from longitudinal movement thereon. For this purpose, the said boss is provided with an annular groove 30 along the center of the same. A guide 31 formed on and extending outwardly from the base 15 of shank 13 is adapted to engage within the said groove and to hold the device from longitudinal movement on the pintle 18. The groove 30 is so constructed as to permit of the rotation of finger 21 about the pintle 18 without disengaging the said guide 31 from the said groove 30, so that the said finger is at all times held centrally upon the pintle 18.

The fingers 19 and 20 are mounted upon the pintle 18 by means of bosses 33 and 34 formed on the ends of the same which are provided with holes 32 through which the pintle 18 passes. These holes are slightly large so as to permit of rocking movement of the said fingers upon the pintle 18 to allow the said fingers to move from the position shown in Fig. 3 to that shown in Fig. 5. The distances between ears 16 and 17 and the boss 29 of finger 21 is sufficient to permit of the rocking movement of the fingers 19 and 20, the said fingers rocking between the surfaces of said ears and the boss 29 as the same are opened and closed. These fingers are deprived of rotational movement by means of two keys issuing outwardly from the base 15 of shank 13, which keys are received within keyways 36 formed in the bosses 33 and 34. By means of these keys and the guides 31, the two fingers 19 and 20 are held from rotational movement about the pintle 18 and guided for lateral rocking movement, while the finger is held from lateral movement, and guided for rotational movement about the said pintle.

For holding the fingers 19, 20 and 21 in closed position, a resilient member 37 is employed which may consist of one or more elastic bands encircling the said fingers in close proximity to the point of attachment of the same to the shank 13. To hold the band 37 in place, these fingers are formed with shoulders 38 which issue outwardly therefrom at the proper locations, as shown in Figs. 1, 2 and 6. This elastic band permits of the individual or joint movement of the fingers in any of their given paths of movement.

For operating the various fingers, I employ a lever 39 which is provided with a yoked portion 40 encircling the portion 41 of finger 21 adjacent the boss 29. This lever is pivoted to the portion 41 by means of a rivet 42 so as to permit of the swinging of the same from the position indicated in full lines in Fig. 2 to that indicated in dotted lines in said figure. This lever extends outwardly from the hand proper and terminates at its outer end in an eye 43 to which is attached the usual draw cord 44 through which the same is manipulated. This draw cord is attached to the shoulder of the wearer in the usual manner and serves to operate the device.

Figure 4:
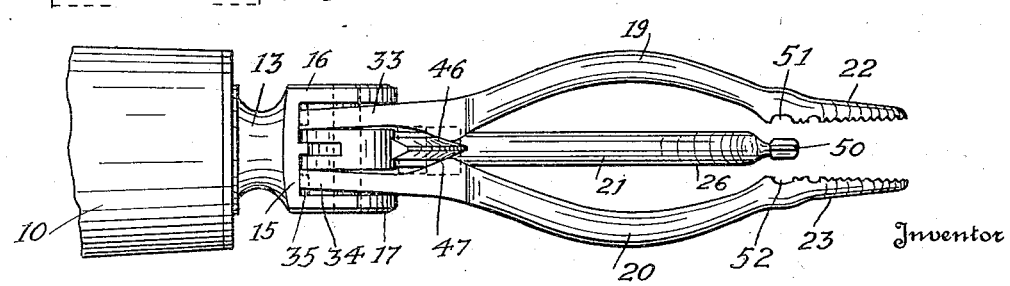
Fig. 4 is a view similar to Fig. 3 illustrating the relation of the parts with the first and second fingers spread apart to unlock the third with respect thereto.

At the other end of the lever 39 is disposed an elongated cam member 45 which is adapted to contact with two cam surfaces 46 and 47 formed on the inner sides of the fingers 19 and 20. While the lever 39 is being moved from its full line to its dotted line position, as shown in Fig. 2, the cam 45 engages with the surfaces 46 and 47 and spreads the fingers apart. This permits of the use of the grasping tips 22 and 23 for picking up smaller objects, as required by the user. As soon as the forward portion 48 of the yoke 40 of lever 39 engages the portion 41 of finger 21, the movement of the said lever with respect to said finger and about rivet 42 terminates. When such position is reached, the parts are disposed with respect to one another, as shown in Fig. 4. Further pull upon the draw cord 44 causes the entire lever 21 to swing about its bearings on the pintle 18 and to move from its position shown in Fig. 2 to that shown in Fig. 6. This swings the finger 21 away from the other fingers to fully open the same to permit of larger objects being grasped between the fingers.

During the movement of the finger 21 from its closed position to its open position, the two fingers 19 and 20 remain open. This is accomplished by forming the cam member 45 arcuate, the center of curvature of which substantially coincides with the axis of the pintle 18. While the finger 21 is being moved into open position, the said cam rides along the cam surfaces 46 and 47 without effecting the respective positions of the same, thereby retaining the open position of the fingers 19 and 20.

The elastic band 37 upon release of the tension on the draw cord 44 serves to move the various fingers into closing position. As this tension is released, the finger 21 first moves into closed position, due to the fact that the cam member 45, being disposed between the cam surfaces 46 and 47 pulls the said fingers apart. As soon as the finger 21 reaches its closed position, the elastic band 37 causes the said cam member 45 to move into its normally inoperative position, as shown in full lines in Fig. 2. This brings the parts into normal position with the free end of finger 21 disposed between fingers 19 and 20 and the parts normally in closed position.

For holding the finger 21 locked with respect to the fingers 19 and 20, the end of the said finger is constructed with a neck 49 terminating in a shouldered head 50. The neck 49 is adapted to be received between two notches 51 and 52 formed in the fingers 19 and 20. These notches are disposed in close proximity to the grasping tips 22 and 23 and are of such a size as to cause the head 50 of the finger 21 to engage the structure of the fingers 19 and 20 surrounding said notches when the fingers are in closed position and to hold the finger 21 locked with respect thereto. In the operation of the device the initial movement of the lever 39 causes the fingers 19 and 20 to spread apart, which disengages the same from the head 50 permitting the finger 21 to thereafter travel free from the fingers 19 and 20. Further movement of the lever 39 oscillates the finger 21 in a manner previously described.

In the use of the device for picking up small articles, the lever 39 is swung a sufficient amount to cause the cam 45 to engage the cam surfaces 46 and 47 and to spread the fingers 19 and 20 apart. Upon release of the said lever, the elastic band 37 causes the fingers 19 and 20 to close and to engage the object placed therebetween. By means of this construction, objects may be readily picked up and handled in the desired manner, the control of the movement of the said fingers through the cam 45 being such as to facilitate the manipulation of said fingers in a manner to readily use the same for the desired purpose. When the hand is to be used for holding or grasping larger objects, the lever 39 is further moved through the draw cord 44 about the pintle 18 and the arm 21 swung outwardly as indicated at Fig. 6. Objects may then be grasped between the finger 21 and both of the fingers 19 and 20, as suggested in Fig. 1, permitting the device to hold various tools and implements. If desired for use in carrying a suitcase, the handle of the same is held within the space 28 of such fingers and lever 39 completely released, which causes the finger 21 to be locked in position between the fingers 19 and 20. In such position, the accidental release of the suitcase handle is entirely precluded, thereby rendering the device highly effective and serviceable for such use. It can readily be comprehended that the invention may be put to numerous other uses than those specified, the same being given merely for the purpose of illustration.

The invention is highly advantageous in that an extremely simple and effective device is provided. The hand is susceptible to readily controllable movement for use in picking up small articles, and also for free movement in picking up larger articles, whereby the single hand may be utilized for all of the ordinary purposes of artificial hands. All of the fingers of the hand are brought into closing position by a single resilient member which may be readily replaced and which is at all times accessible for adjustment and inspection. The device is extremely simple in construction and is neat in appearance and can be manufactured at a reasonable cost. Far greater degree of movement can be had for the purpose for which the device is designated than has heretofore been possible, and the device may be put to greater use than possible with other devices.

Changes in the specific form of my invention, as herein disclosed, may be made within the scope of what is claimed without departing from the spirit of my invention.

Having described my invention, what I claim as new and desire to protect by Letters Patent is:

1. An artificial hand comprising a support, a pintle mounted in said support, a pair of fingers mounted on said pintle and arranged for endwise rocking movement thereon, a third finger rotatably mounted on said pintle, and means for successively rocking said first named fingers to move the same toward and from one another and swinging said third finger about its pivot.

2. An artificial hand comprising a support, a plurality of fingers carried by said support, a pintle attached to said support and passing jointly through said fingers, one of said fingers being rotatable on said pintle about the axis thereof, means for restraining rotational movement of the other fingers about the axis of said pintle, said last named fingers being movable in a direction at right angles to the movement of the first named finger, and means for moving said fingers.

3. An artificial hand comprising a support, a pintle mounted in said support, a finger pivoted to said pintle intermediate the ends thereof, a pair of fingers mounted on said pintle on opposite sides of the said first named finger, said last named fingers being arranged to rock upon said pintle relative to one another, means for restraining said second named fingers from rotation about the axis of said pintle, and means for moving the fingers relative to one another.

4. An artificial hand comprising a support, a pintle mounted in said support, a finger pivoted to said pintle intermediate the ends thereof, means for restraining the longitudinal movement of said finger relative to said pivot, a pair of fingers mounted on said pivot and movable toward and from one another, and means for restraining said last named fingers from rotational movement about the axis of said pivot.

5. An artificial hand comprising a frame structure including a base, ears extending outwardly therefrom, a pintle mounted in said ears, a finger spaced from said ears and journalled upon said pintle for rotation about the axis thereof, a groove formed in said finger, a key on said frame adapted to engage within said groove for holding said finger from longitudinal movement, a pair of fingers mounted upon said pintle on opposite sides of said first named finger, said second named fingers being movable between said ears and first named finger, notches in said second named fingers, and keys on said frame for engagement with said notches for restraining the rotational movement of said fingers about the axis of said pintle.

6. An artificial hand comprising a plurality of fingers movable relative to one another, a lever movable in different directions, means connected with said lever and fingers for operating said fingers, said lever upon movement in one direction serving to move two of said fingers relative to one another, and upon movement in another of its directions to move another of said fingers with respect to one of said fingers.

7. An artificial hand comprising a pair of fingers movable toward and from one another, a third finger movable toward and from the first two, a lever for moving said third finger relative to the first two, and means operated by said lever for moving the first two fingers relative to one another independently of the movement of said third finger.

8. An artificial hand comprising a pair of fingers, movable toward and from one another, a third finger movable toward and from the first two, a lever for moving said third finger relative to the first two, and a cam operated by said lever for moving the first two fingers relative to one another independently of the movement of said third finger.

9. An artificial hand comprising a pair of fingers, movable toward and from one another, a third finger movable toward and from the two first named fingers, a lever pivoted to said third finger for moving the same relative to said first named fingers, and means operated by said lever for moving said first two fingers relative to one another.

10. An artificial hand comprising a pair of fingers, movable toward and from one another, a third finger movable toward and from the two first named fingers, a lever pivoted to said third finger for moving the same relative to said first fingers, a cam attached to said lever, a pair of cam surfaces formed on said two first named fingers and being adapted to be engaged by said cam for swinging said two first named fingers relative to one another.

11. An artificial hand comprising a plurality of fingers movable relative to one another, a lever movable about a plurality of axes, means operated by said lever for moving two of said fingers relative to one another upon movement of said lever about one axis, and means operated by said lever for moving another of said fingers on movement of said lever about another of its axes.

12. An artificial hand comprising a support, a pair of fingers mounted in said support and movable toward and from one another, a third finger pivoted to said support and movable toward and from said first named fingers, a lever pivoted to said third finger, an arcuate cam attached to said lever, cam surfaces formed on said first named fingers adapted to be engaged by said cam and serving to move said first and second fingers away from one another upon movement of said lever about its pivot, and a stop formed on said lever adapted to engage said third finger for causing the oscillation of said third finger about its pivot to move the third finger from said first named fingers, said arcuate cam riding along said cam surfaces during the oscillation of said third finger about its pivot, and maintaining said first named fingers open throughout such movement.

In testimony whereof I have affixed my signature to this specification.

JUSTUS WILHELM BAEHR.